United States Patent
Scott-Cowley et al.

(10) Patent No.: US 9,634,974 B2
(45) Date of Patent: *Apr. 25, 2017

(54) ENHANCING COMMUNICATION

(71) Applicant: Mimecast North America Inc., Watertown, MA (US)

(72) Inventors: Orlando Scott-Cowley, Essex (GB); Nathaniel S. Borenstein, Greenbush, MI (US)

(73) Assignee: MIMECAST NORTH AMERICA, INC., Watertown, MA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/052,044

(22) Filed: Feb. 24, 2016

(65) Prior Publication Data
US 2016/0173432 A1 Jun. 16, 2016

Related U.S. Application Data

(63) Continuation of application No. 13/044,842, filed on Mar. 10, 2011, now Pat. No. 9,294,308.

(51) Int. Cl.
*H04L 12/58* (2006.01)
*H04W 12/08* (2009.01)

(52) U.S. Cl.
CPC ............ *H04L 51/16* (2013.01); *H04L 12/586* (2013.01); *H04L 12/588* (2013.01); *H04L 51/04* (2013.01); *H04L 51/12* (2013.01); *H04W 12/08* (2013.01)

(58) Field of Classification Search
None
See application file for complete search history.

(56) References Cited

U.S. PATENT DOCUMENTS

| 6,654,735 B1 | 11/2003 | Eichstaedt et al. |
| 6,873,985 B2 | 3/2005 | Newman |
| 7,003,517 B1 | 2/2006 | Seibel et al. |
| 7,082,427 B1 | 7/2006 | Seibel et al. |
| 7,143,091 B2 | 11/2006 | Charnock et al. |
| 7,184,970 B1 | 2/2007 | Squillante |

(Continued)

FOREIGN PATENT DOCUMENTS

| EP | 2 461 554 | 6/2012 |
| JP | 2010-204914 | 9/2010 |

(Continued)

OTHER PUBLICATIONS

Chenkova and Koychev, "A Just-In-Time Information Retrieval Agent that Provides Context Aware Support of Text Creation," Proceedings of International Conference on Software, Services & Semantic Technologies, Oct. 28-29, 2009, Sofia, Bulgaria, ISBN: 978-954-9526-62-2. Retrieved from the Internet: http://research.uni-sofia.bg/handle/10506/658.

(Continued)

*Primary Examiner* — Trang Doan
(74) *Attorney, Agent, or Firm* — Brown Rudnick LLP; Mark S. Leonardo; Weber Hsiao

(57) ABSTRACT

Among other things, from content of a communication composed by a user, a strategy is inferred for selecting target information related to the content. The strategy is used to select target information from a body of target information. And information about the selected target information is reported to the user.

23 Claims, 12 Drawing Sheets

(56) References Cited

U.S. PATENT DOCUMENTS

Figure 1A:
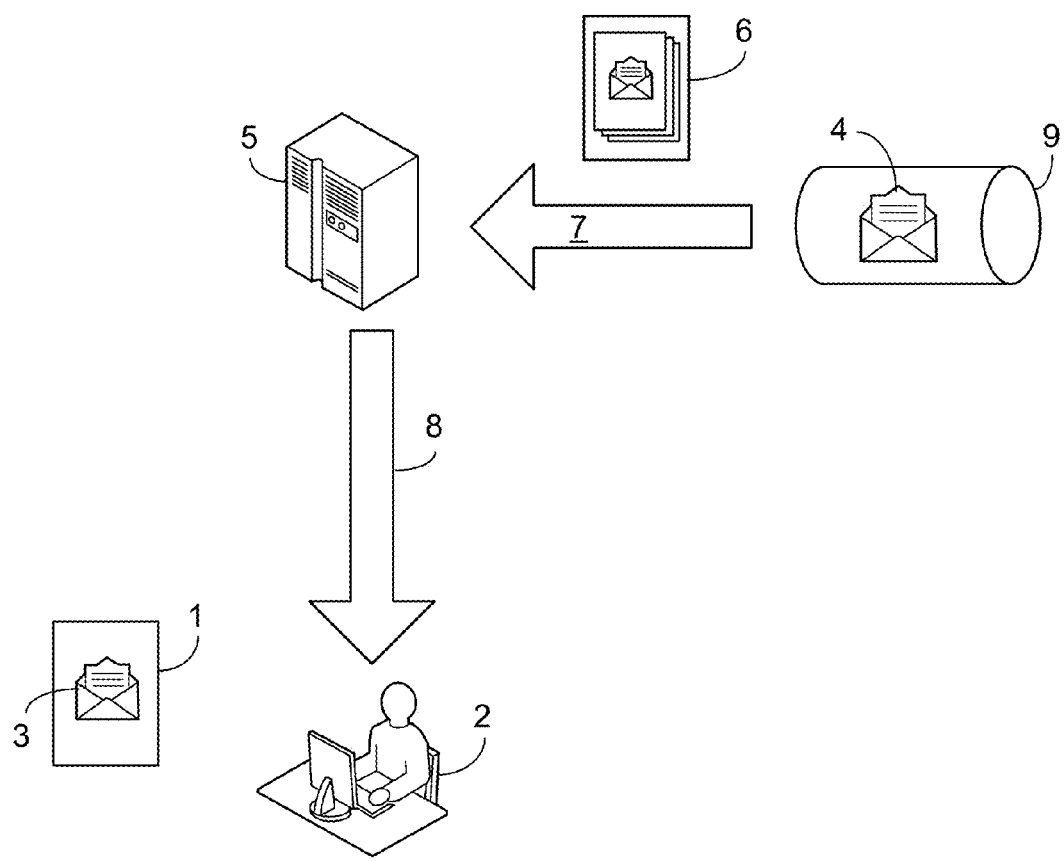

| | | | |
|---|---|---|---|
| 7,412,489 B2 | 8/2008 | Nowacki et al. | |
| 7,647,398 B1* | 1/2010 | Fan | G06F 21/552 709/206 |
| 7,886,053 B1* | 2/2011 | Newstadt | H04L 63/102 709/223 |
| 8,281,372 B1* | 10/2012 | Vidal | H04L 51/12 709/206 |
| 9,294,308 B2 | 3/2016 | Scott-Cowley et al. | |
| 2005/0060328 A1* | 3/2005 | Suhonen | H04L 63/0263 |
| 2005/0108435 A1 | 5/2005 | Nowacki et al. | |
| 2006/0170705 A1 | 8/2006 | Wilson | |
| 2007/0124400 A1 | 5/2007 | Lee | |
| 2008/0196093 A1* | 8/2008 | Benschop | G06Q 20/10 726/5 |
| 2008/0256458 A1* | 10/2008 | Aldred | G06F 21/6218 715/741 |
| 2008/0307046 A1 | 12/2008 | Baek et al. | |
| 2009/0089882 A1* | 4/2009 | Hofmann | H04N 7/163 726/28 |
| 2009/0100529 A1 | 4/2009 | Livnat et al. | |
| 2009/0119290 A1* | 5/2009 | Lee | H04L 12/58 |
| 2009/0129278 A1 | 5/2009 | Kumar et al. | |
| 2009/0254620 A1* | 10/2009 | Best | G06Q 10/107 709/206 |
| 2009/0299970 A1 | 12/2009 | Rodriguez | |
| 2009/0300511 A1 | 12/2009 | Behar et al. | |
| 2010/0250685 A1 | 9/2010 | Kunz et al. | |
| 2011/0113059 A1* | 5/2011 | Lee | G06Q 10/10 707/769 |
| 2011/0113109 A1* | 5/2011 | LeVasseur | H04L 51/12 709/206 |
| 2011/0320373 A1 | 12/2011 | Lee et al. | |
| 2012/0143960 A1* | 6/2012 | Corrao | H04L 51/16 709/206 |
| 2012/0233662 A1 | 9/2012 | Scott-Cowley et al. | |

FOREIGN PATENT DOCUMENTS

| | | |
|---|---|---|
| WO | WO 2004/084044 | 9/2004 |
| WO | WO 2007/008878 | 1/2007 |
| WO | WO 2012/001476 | 1/2012 |

OTHER PUBLICATIONS

Google—About Google Instant [online], [retrieved on Mar. 9, 2011]. Retrieved from the Internet: http://www.google.com/instant, 1 page.

Lightning-Fast Search [online], [retrieved on Jan. 24, 2011]. Retrieved from the Internet: http://www.xobni.com/search-outlook, 1 page.

Knowledge Network for Microsoft Office SharePoint Server 2007 [online], [retrieved on Mar. 22, 2011]. Retrieved from the Internet: http://office.microsoft.com/en-us/sharepoint-server-help/knowledge-network-for-microsoft-office-sharepoint-server-2007-HA010168724.aspx, 4 pages.

Microsoft Outlook 2010—Find a message or item with Instant Search [online], [retrieved on Mar. 10, 2011]. Retrieved from the Internet: http://office.microsoft.com/en-us/outlook-help/find-a-message-or-item-with-instant-search-HA010354952.aspx, 2 pages.

Xobni Rank™-powered AutoSuggest [online], [retrieved on Jan. 24, 2011]. Retrieved from the Internet: http://www.xobni.com/autosuggest-outlook, 2 pages.

Partial European Search Report for U.S. Appl. No. 12,158,956, dated Jun. 15, 2012, 6 pages.

European Search Report for U.S. Appl. No. 14/167,468, dated Aug. 5, 2014, 3 pages.

Office Action from European App. Ser. No. 14 167 468, dated Oct. 14, 2014, 4 pages.

Office Action from European App. Ser. No. 14 167 468, dated Apr. 27, 2015, 6 pages.

Office Action from European App. Ser. No. 12 158 965.9, dated Oct. 11, 2012, 6 pages.

Office Action from Great Britain App. Ser. No. GB1204227.1, dated Jun. 29, 2012, 7 pages.

Office Action from Great Britain App. Ser. No. GB1204227.1, dated Jul. 5, 2013, 2 pages.

Search Report for App. Ser. No. GB1204227.1, dated Sep. 24, 2012, 3 pages.

Search Report for App. Ser. No. GB1204227.1, dated Sep. 21, 2012, 3 pages.

Office Action from App. Ser. No. GB1204227.1, dated Dec. 5, 2013, 3 pages.

Combined Search Report and Examination Report for App. Ser. No. GB1309064.2, dated Jun. 25, 2013, 4 pages.

Examination Report for App. Ser. No. GB1309064.2, dated May 1, 2014, 25 pages.

Examination Report for App. Ser. No. GB1309064.2, dated Dec. 11, 2014, 6 pages.

Combined Search Report and Examination Report for App. Ser. No. GB1400060.8, dated Jan. 17, 2014, 6 pages.

Examination Report for App. Ser. No. GB1400060.8, dated Jul. 2, 2014, 5 pages.

\* cited by examiner

ENHANCING COMMUNICATION

RELATED APPLICATION

This application is a continuation (and claims the benefit of priority under 35 USC 120) of U.S. application Ser. No. 13/044,842, filed Mar. 10, 2011, now U.S. Pat. No. 9,294,308, the contents of which are incorporated herein in their entirety by reference.

BACKGROUND

This description relates to enhancing communication.

Web-based email messaging, for example, can be enhanced by displaying to an email user advertisements or links that have been inferred to be related to the content of received or sent emails that are simultaneously being displayed to the user.

In enterprise-controlled email messaging, for example, messages are sometimes threaded so that a user to whom one message is being displayed is also told about the existence of other related emails in the thread.

SUMMARY

The enhancing of communication that we describe here may encompass one or more of the following (and other) aspects, features, and implementations, and combinations of them.

In general, in an aspect, from content of a communication composed by a user, a strategy is inferred for selecting target information related to the content. The strategy is used to select target information from a body of target information. And information about the selected target information is reported to the user.

Implementations may include one or more of the following features. The user may be given access to at least some of the target information. The communication includes an email. The strategy includes a database query. The body of target information includes an archive. The body of target information includes an email archive. The body of target information includes an email archive maintained by or on behalf of a private enterprise. The reporting occurs at regular intervals. The regular intervals include daily intervals. The reporting occurs as the user composes the communication. The reporting is updated as the user composes the communication. The body of target information includes blogs, social network communications, news articles, journal publications, and patents. The selected target information includes email messages stored in a digital storage mechanism. The digital storage mechanism includes at least one of an archive, a file, a message store, or a database. The body of target information includes documents. The selected target information includes documents. Inferring the strategy includes analyzing textual elements included in communication being composed by the user. The selected target information is identified as being associated with security permissions with respect to the user, a change in the security permissions is mediated to permit reporting of the information to the user. The change in the security permissions includes giving the user access to the selected target information associated with the security permissions. The change in the security permissions is time limited. Mediating a change in the security permissions to permit reporting of the information to the user includes requesting an authorized party to grant access to the user. The access grant is requested using a real-time communication method including at least one of telephone and instant message. The access grant is requested using an asynchronous communication method including at least one of email and voicemail.

In general, in an aspect, based on a permissions protocol associated with users of a communication system or with stored communications or with both users and stored communications, a particular user may access stored communications belonging to users in conformity with the permissions protocol. The particular user is prevented from accessing emails not in conformity with the permissions protocol.

Implementations may include one or more of the following features. The permissions protocol defines a hierarchy of users, and the particular user may access stored communications belonging to users below the particular user in the hierarchy, and may not access stored communications belonging to users above the particular user in the hierarchy. The permissions protocol defines groups of users of the communication system and permissions associated with stored communications. A particular user may access stored communications belonging to users within a group to which the particular user belongs.

In general, in an aspect, a user interface enables a user to compose a communication, and, in connection with the composing of the communication, information is reported to the user that has been selected based on content included by the user in the communication.

The information is reported either in real time as the user is composing the communication or on a schedule related to the composing of the communication.

In general, in an aspect, in real time, as a user composes a communication, reporting to the user about other information that has been determined to relate to the user's communication based on content that the user includes in composing the communication.

In general, in an aspect, a user interface displays to a user who is composing content for a communication that has not yet been finished or sent, target information that has been fetched from an archive and has been determined to relate to content that appears in the portion of the communication that has already been composed by the user. In some implementations, the communication includes an email or a fax or a voice message.

These and other aspects, features, and implementations, and combinations of them, may be expressed as apparatus, methods, methods of doing business, means or steps for performing functions, components, systems, program products, and in other ways.

Other aspects, features, and advantages will be apparent from the description and the claims.

DESCRIPTION

Figure 1B:
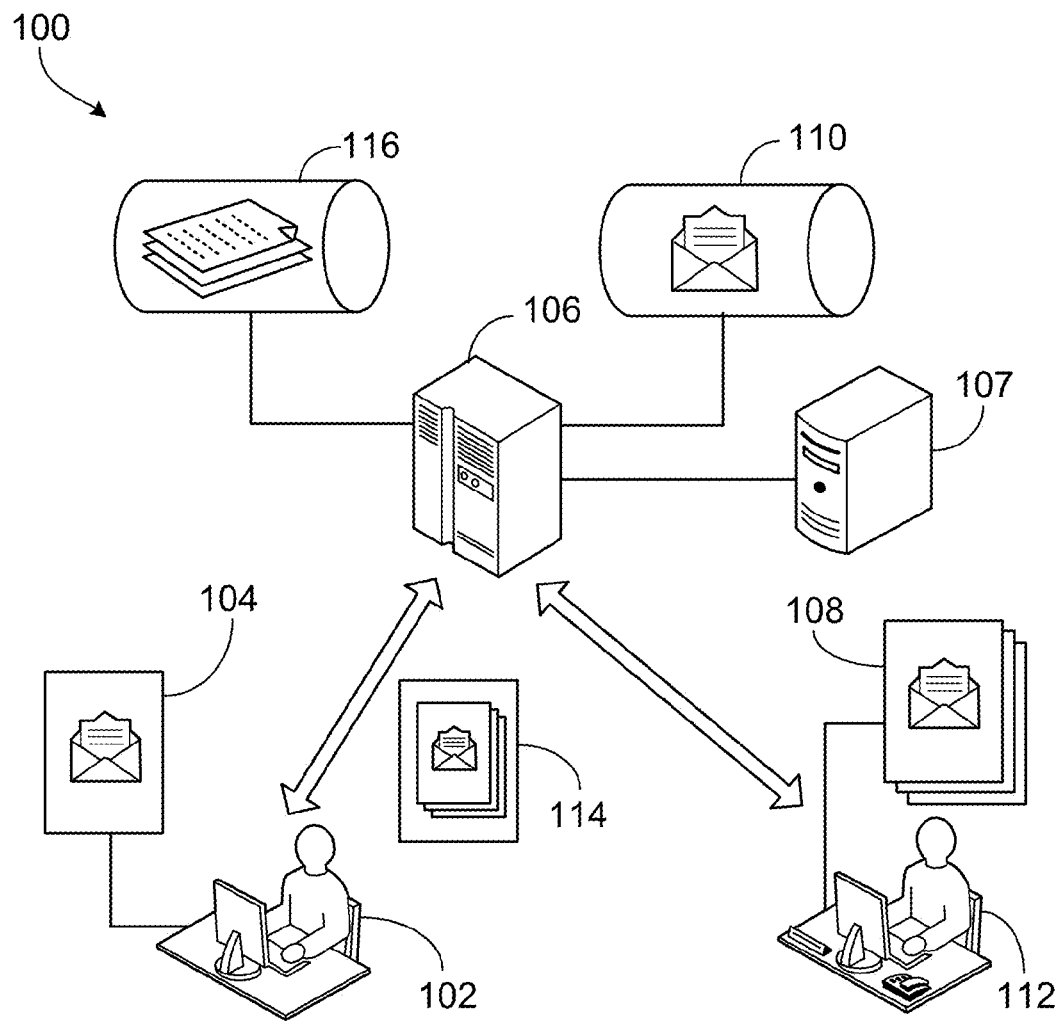
Figure 4:
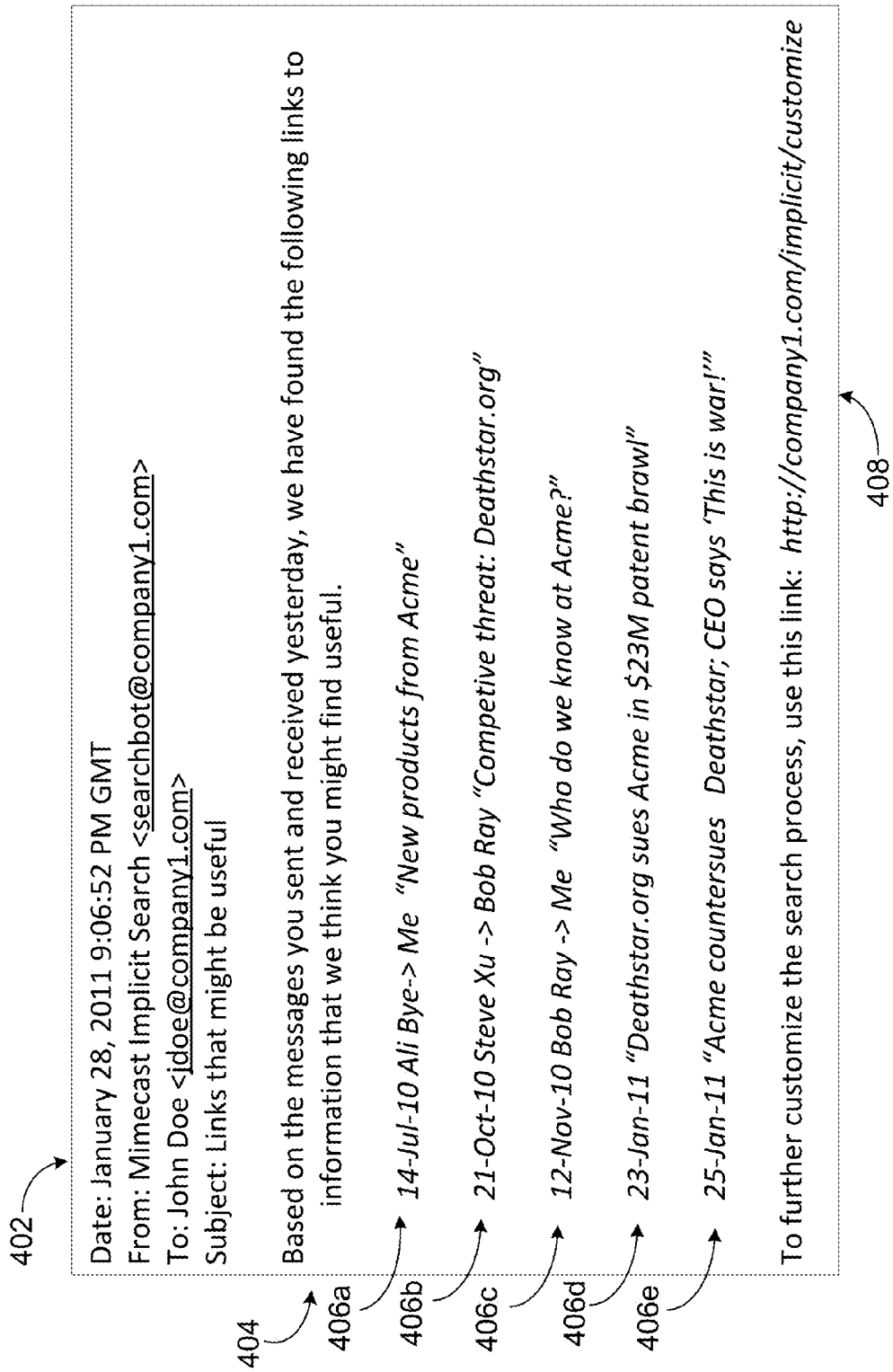
Figure 5A:
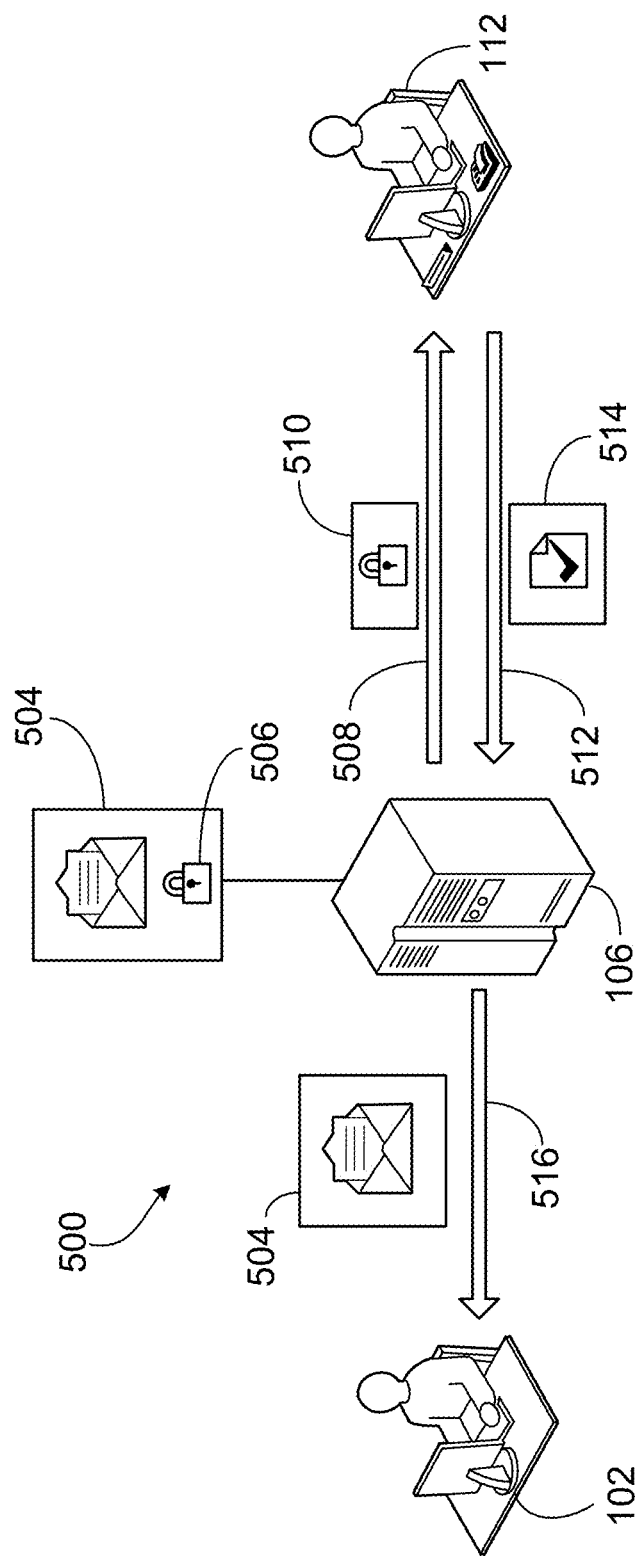
Figure 5B:
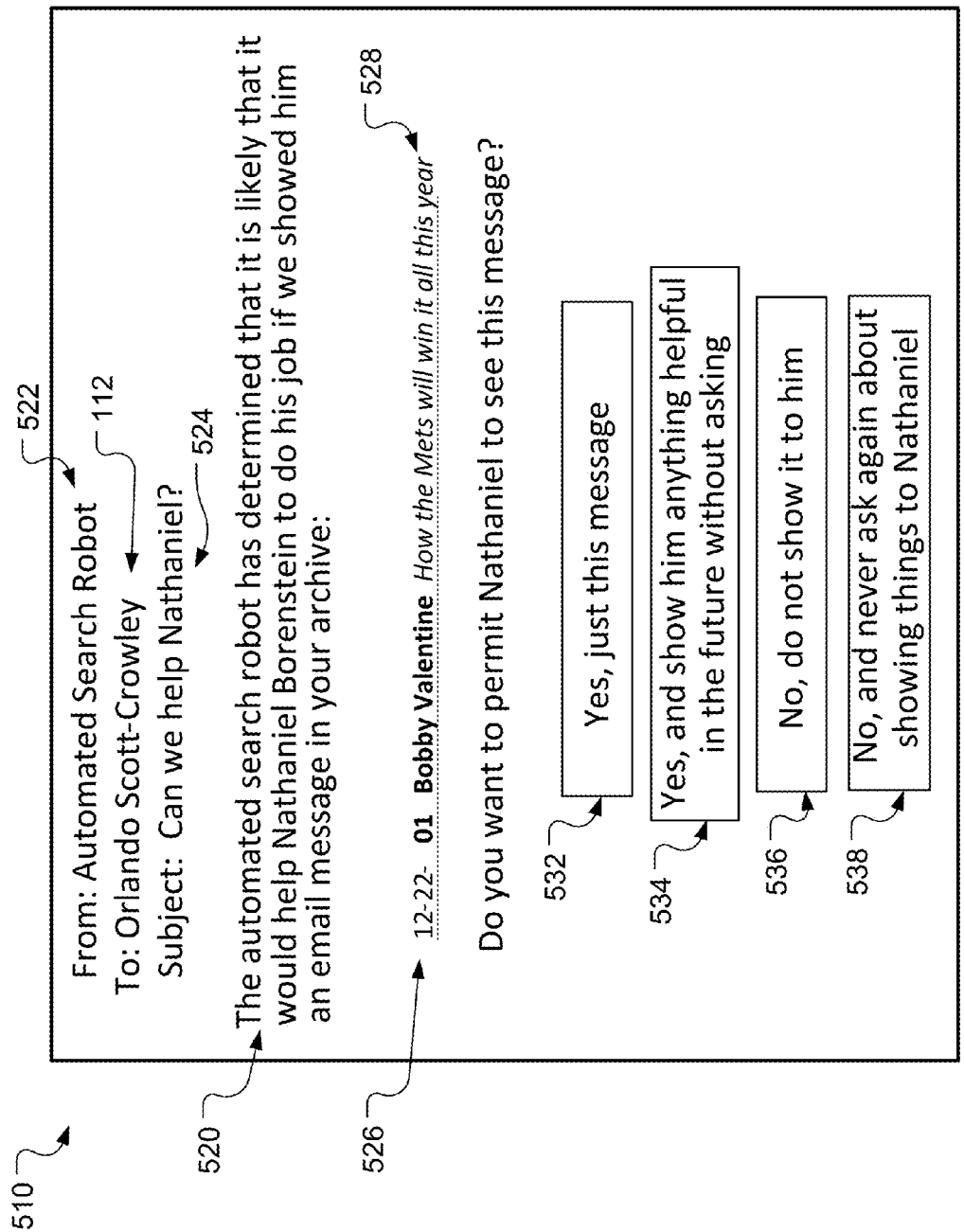
Figure 6:
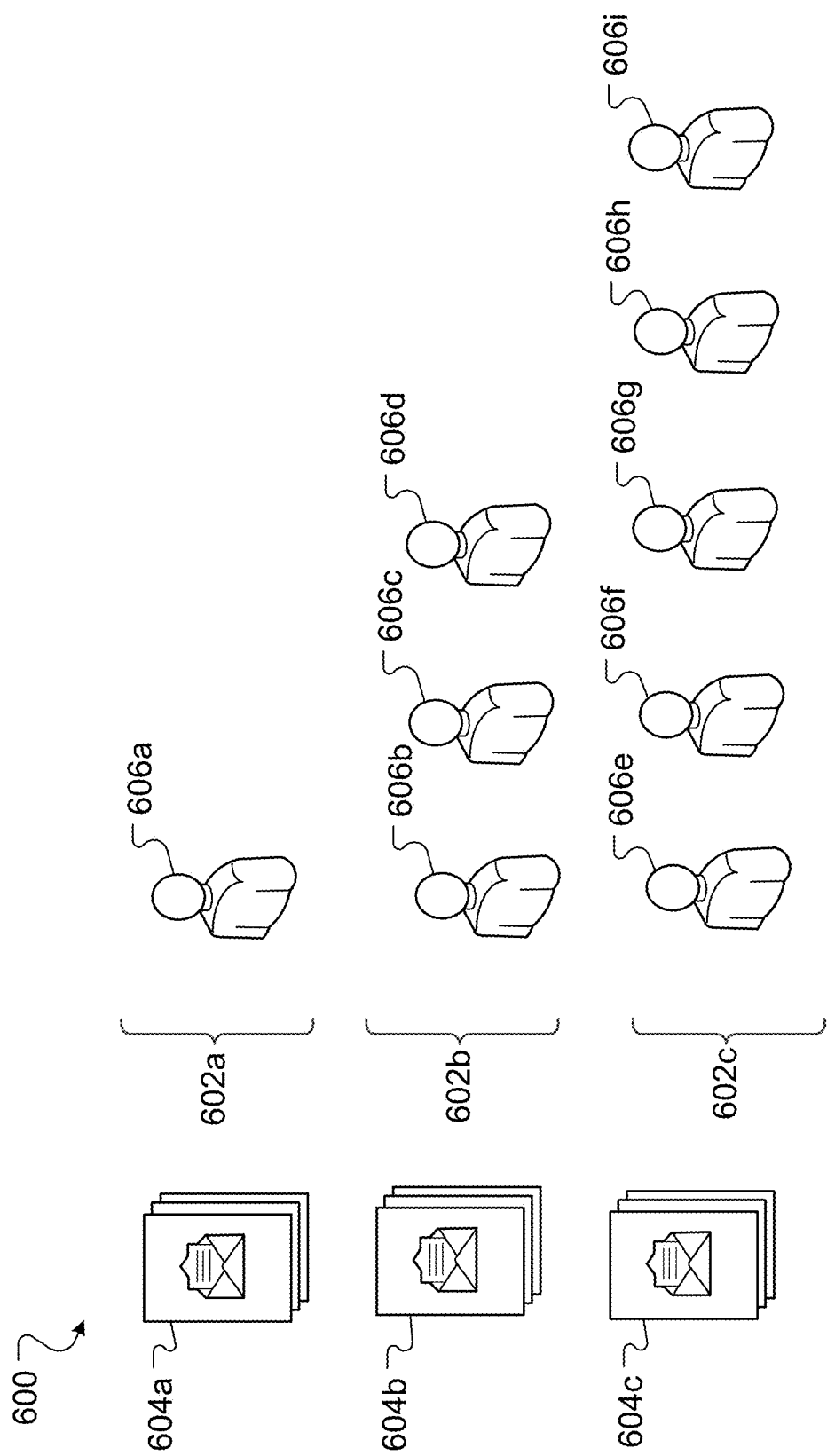
Figure 7:
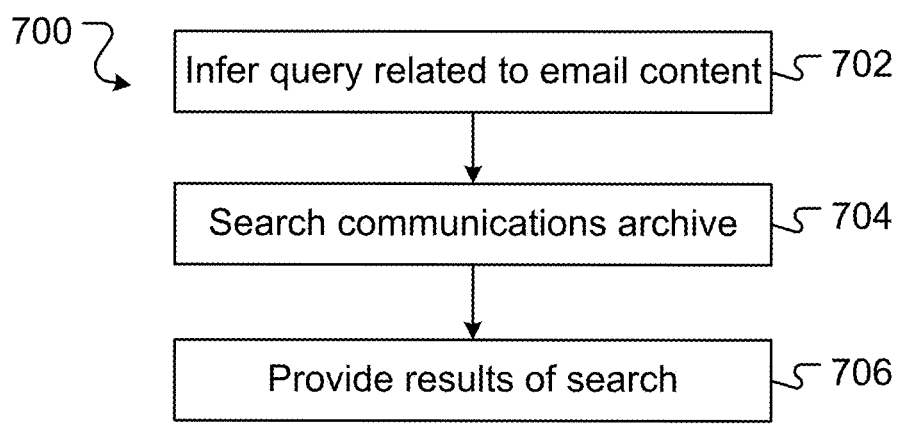
Figure 8:
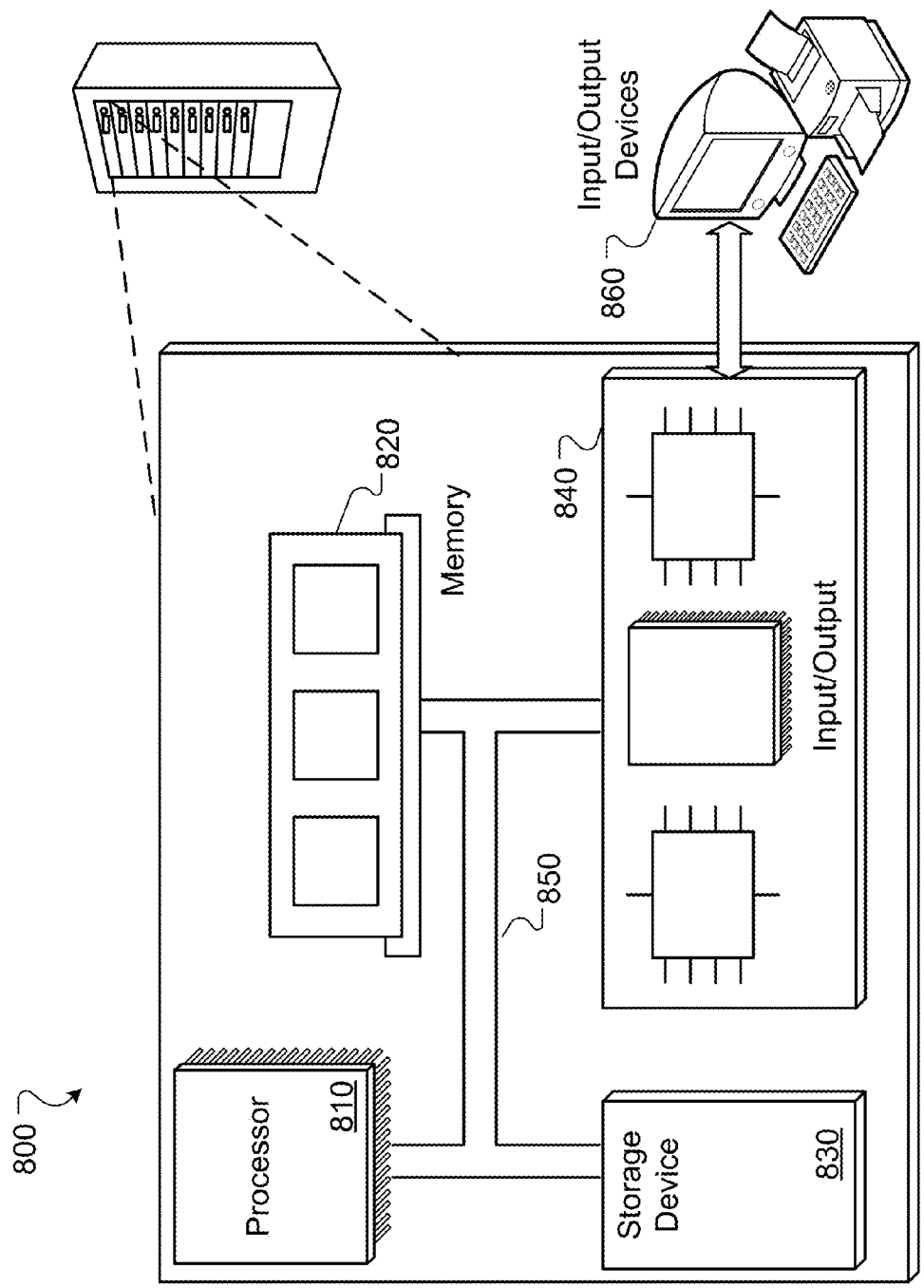

FIG. 1A is a block diagram of a system
FIG. 1B is a block diagram of an email system.
FIGS. 2A to 2C, 3, and 4 are emails.
FIG. 5A is a diagram of an interaction.
FIG. 5B is an email.
FIG. 6 is a diagram of a user hierarchy.
FIG. 7 is a flowchart.
FIG. 8 is a block diagram.

When a user composes a new communication, such as an email, content of the new communication can be used to identify and make the user aware of other information (such as archived communications stored by the enterprise that hosts the communication system) that relates to the content of the new communication. For example, a search engine can use content of a new email in formulating an implicit search key to find other related archived emails. The user may find that the pertinent archived communications contain information useful to the user even though the user might not have otherwise known they existed and were available to him.

In some implementations, a list of pertinent archived communications can be displayed in real-time as the user composes the new communication. For example, the archived communications can be shown in a sidebar window alongside a new email being composed. The pertinent archived communications can also be compiled and provided to the user as a digest on a schedule, such as daily or hourly.

Often, an organization-wide archive stores some of the pertinent communications that may be shown to the user, but the user's access to the organization-wide archive may be limited, because of its volume, restrictions on access, or for other reasons. For example, the user may have access to archived communications written by himself and his peers and subordinates, but not to archived communications written by superiors. The search engine can identify pertinent communications that the user does not have explicit access to and then ask the owner of the access-limited communications (or ask another authorizing party) to grant the user access only to the pertinent access-limited communications. The search engine could notify the user that the owner of an archived communication has also done work (e.g., created a communication) relating to the communication that the user is composing. Then, the user can follow up with the owner directly.

Thus, as shown in FIG. 1A, in a broad sense, in what we describe here, there is a source communication or communications 1 composed or created or formed by a user or users 2. The source communication has content 3. We sometimes use the singular "communication" and the singular "user" to refer also to the corresponding plurals, and likewise for other words used here. There is a body or bodies of target information 4 that may be considered or known or inferred to be related to the content in the source communication. The content, or a portion of it, is used by a facility 5 as the basis for identifying, searching, and/or fetching 7 the selected information 6 from the bodies of target information that is related to the source communications. The facility reports 8 to the user 2 reported information about the selected information 6, for example, links to that information or samples of the information. The target information 4 is provided by, obtained from or located at one or more information sources 9.

In some examples, all of the elements shown in FIG. 1A are under the control of a single organization or enterprise, such as a corporation. In some examples, various combinations of the elements are under the control of different parties. In some cases, for example, the information sources can include public or private third-party sources, the users 2 could be any people or processes located anywhere in the world, and the facility 5 could be operated by a third-party, for example, for a fee.

The respective timing of the activities represented in FIG. 1A can vary widely. For example, the composing of the source communication by the user and the reporting of the reported information back to the user can occur essentially in real time. On the other hand, the reported information could be sent back to the user at a later time. Also, although typically the target information (or much of it) will have been archived at a time prior to when the user is composing the source communication, it is also possible for target information that is provided by information sources in real time also to be part of the information reported back to the user.

We use the term communication very broadly to include, for example, any mode, medium, method, means, or mechanism that can be used to carry information (in its broadest sense) between or among people or processes. Generally, our use of the term communication is not referring to the electronic medium by which a communication is carried, for example by wire, wirelessly, or through a network, but rather the form in which the communication is expressed and how it is captured in tangible form. Thus, the communication can be captured, for example, by typing, by touching, by speaking, by gesturing, or by behavior or conduct. The communication can be captured in virtually any tangible (but typically electronic) form, such as, for example, email, instant messages, blog posts, social media content, memoranda, news articles, videos, audio recordings, telephone calls, speeches, slide presentations, spreadsheets, word processing documents, or reports, to name a few.

We use the term information in its broadest sense. The target information could be any kind of information in any form stored in any way and in any place, for example, emails, letters, reports, instant messages, blog posts, social media content, memoranda, news articles, videos, audio recordings, telephone calls, speeches, slide presentations, spreadsheets, word processing documents, financial reports, accounting information, data, databases, files, folders, repositories, webpages, advertisements, trade material, engineering materials, and design materials, to name a few.

We use the term content to refer, for example, to any aspect, feature, or element of any communication that could have meaning or value or use for any of the users or for the facility in its work. Content could include, for example, letters, words, phrases, sentences, numbers, images, video, graphics, layout, sounds, and audio, and could include more abstract meaning, for example, intent, concepts, plans, abstractions, goals, wishes, models, characterizations, and a wide variety of other abstractions.

We sometimes refer to the target information as being archived. We use the term archived in a very broad sense to refer, for example, to any information that has been stored, held, placed in a repository, accumulated, aggregated, transmitted, assembled, or remembered, regardless of the form, location, timing, ownership, or other aspects of the archiving.

We sometimes refer to organizations, enterprises, or other entities, and we mean these references to be considered very broadly to include, for example, companies, employers, organizations, governments, and any other kind of entity.

We also sometimes refer to the owner of information. We use the term owner to refer, for example, to any party that owns, controls, leases, possesses, manages, or has charge of the information.

We use the term composed, with reference to a source communication, in the broadest sense to include, for example, any act of creating, forming, assembling, authoring, or entering the communication.

We use the term related (and similar terms and phrases such as "relevant to") very broadly to include for example any kind of connection between content and source communications and target information that may be reported to the users. The relationship or connection could be, for example, that common content appears in the target information, or that the target information is relevant to the content. The relationship or connection could be the existence of content in the target information that is objectively shared in common with the content in the source communication. In some examples, the relationship or connection could be inferred or determined by analysis and relate to a more abstract association. For example, the facility 5 could infer from the use of certain words (such as market, sales, shoes, France) that the user is interested in proposing new ways for an entity to increase its sales of shoes in Europe. Facility 5 then could search for and select target information that would be of interest to the user in that respect. Note that the facility 5 could look for target information that is not only helpful to the user in performing a task, but also achieves other results with respect to the user, for example, motivating the user, or challenging the user, or inspiring the user, or making her laugh, or altering her emotional state, or inspiring her to take some action, or to not take some action, among other things. In some examples, the facility 5 could observe the informal communications of children/students and produce informal lessons tailored to be of interest to them. For example, a student who plays a lot of baseball might do better if his math story problems referred to baseball.

In the description of the following specific example, we are referring to an email system owned by an enterprise and used by employees of the enterprise. Of course, there are a very wide variety of other examples and implementations that fit within the concepts being discussed here and the terms described above.

In FIG. 1B, an email system 100 enables a user 102 to become aware of (e.g., to have reported to her) related communications such as other emails that have been composed by other users who are employees of a common enterprise and that have been archived by the enterprise. When the user 102 composes an email 104, an email server 106 can identify other emails 108 that may be related to the user's email 104 and provide information about the other emails 108 to the user 102. The email server 106 can perform this identification by using contents of the email 104 as an implicit search key to search a database 110 containing emails (e.g., some or all of the emails stored by the user's employer or other organization) for other emails related to the email 104 that the user 102 is composing. The other emails 108 (which are an example of target information) may have been composed by users at another entity such as another user 112, and so the user 102 may be unaware that the other emails 108 exist and that they may relate to the email 104 that the user 102 is composing.

In some implementations, the search functions are performed by an email search server 107 operating in association with the email server 106. For example, the email search server 107 can be a specialized search machine that has access to the database 110, The email search server 107 might reside on the same computer system as the email server 106 or the database 110 or the email search server 107 might stand on its own or even run on multiple machines. When we refer to actions generally performed by the email server 106, the actions could be performed more specifically by the email search server 107.

When the email server 106 identifies the other emails 108 related to the email 104 that the user 102 is composing, the email server 106 can provide the other emails 108 or information about the other emails 108 to the user 102. For example, the email server 106 can provide a summary 114 of the other emails 108, or links to them, and the user 102 can choose to access some or all of the other emails 108 based on the information provided in the summary 114.

The email server 106 (an example of a facility 5) can also use content of the email 104 as a search key to search a secondary database 116 containing communications or sources of information other than emails. For example, the secondary database 116 may contain information such as blogs, social network communications, news articles, journal publications, and patents (which are other examples of target information). Any kind of secondary content database 116 containing or referencing text documents could be used, and the secondary content database 116 could also contain non-textual information if the email server 106 has the capability to search non-textual information. The email server 106 may have access to many such secondary content databases 116. Some secondary content databases 116 may be available locally to the email server 106 (for example, in a data storage component of the server), or they may be accessible via a network such as a local area network (LAN) or the Internet. The secondary content database 116 and/or the facility 5 could take the form of an Internet search engine.

The database 110 and the secondary content database 116 can be any kind of database, for example, a digital storage mechanism such as an archive, a file, or a message store.

Figure 2A:
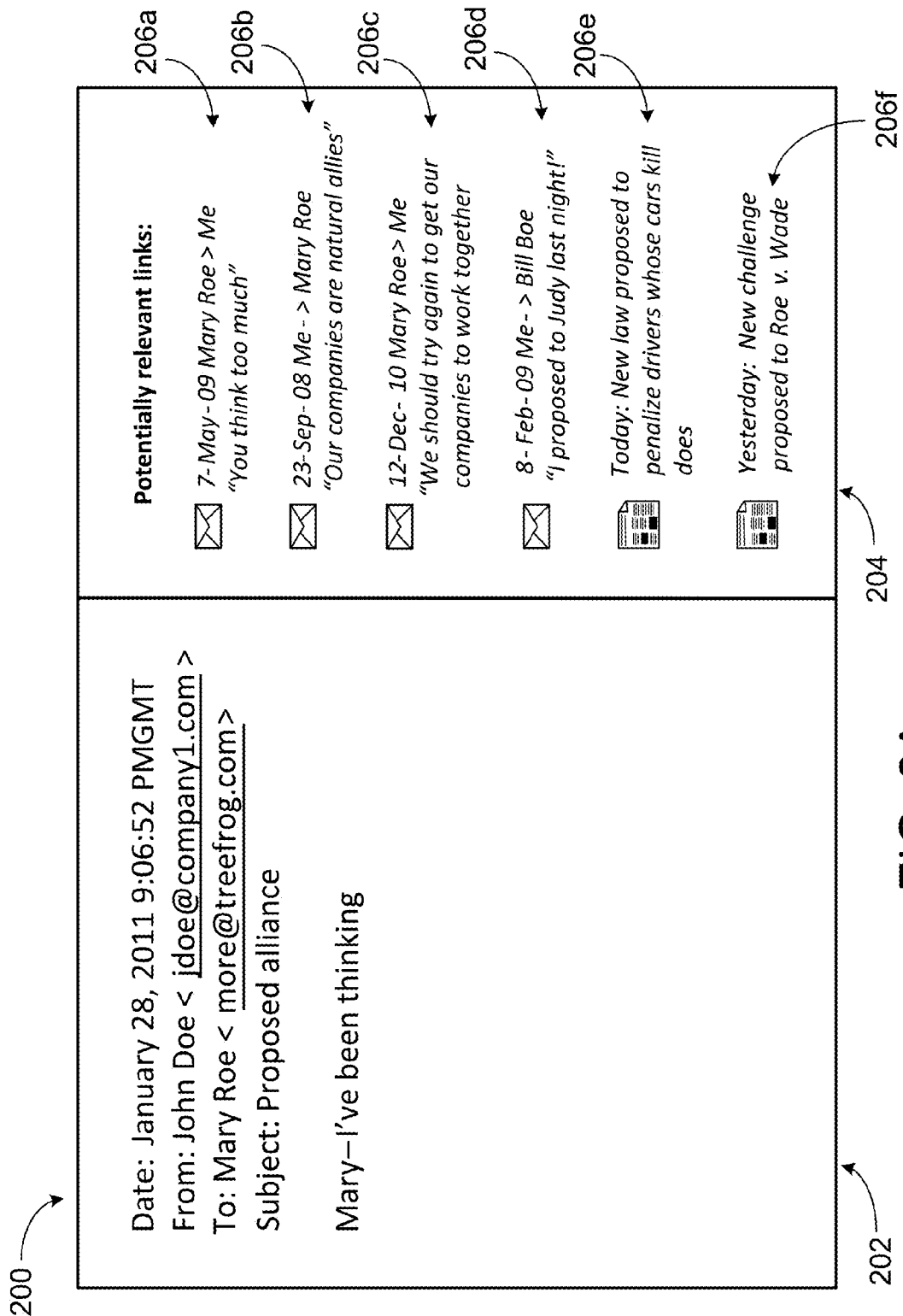

FIG. 2A shows an example of an email interface 200 including an email 202 (an example of a source communication) being composed and a related content list 204 that is being displayed (in real time as the email that is the source communication is being composed) alongside the email 202. The related content list 204 (an example of reported information 8) represents search results of a search query inferred from the content of the email 202. For example, the related content list 204 could be provided by the email server 106 shown in FIG. 1B based on a search performed by the email server 106 and could be sorted by relevance with the most relevant items at the top of the list and less relevant items farther down the list. In the example shown, as the user ("John Doe") begins typing an email 202 to a colleague ("Mary Roe"), the email interface 200 provides the related content list 204 based on the content of the email 202. For example, some related content 206a-206d is other emails, and other related content 206e-f is news articles. In some implementations, some of the related content 206a-206d is retrieved from a content database (e.g., content database 110 shown in FIG. 1B) containing emails, and other related content 206e-f is retrieved from a secondary content database (e.g., secondary content database 116 shown in FIG. 1B) containing types of information other than emails, for example, news articles.

In the example shown in FIG. 2A, the list 204 does not include the full content of each of the items of target information. Only a relevant portion of the text of each email is shown along with the date, author, and recipient of the email. Of course, a wide variety of choices could be made about what information to show, at what level, in what quantity, and in what format.

In the example shown in FIG. 2A, the related content 206a-206f was identified in a search performed using a search query based on analyzing words included in the email 202 with the goal of finding content related to the email 202. For example, two items of related content 206a-206c were identified in a search and are related in part because they are also emails between the user and the same colleague. Past emails between the user and his colleague may share a topic or theme with the email 202 that the user is now composing. Further, the first item of related content 206a also includes the word "think," which is related to the word "thinking," which appears in the email 202. Also, the second item of related content 206b includes the word "allies," which is related to the word "alliance," which appears in the email 202. Farther down on the related content list 204, three items of related content 206d-206f are related in part because the word "proposed" is present in both the email 202 and the items of related content 206d-206f.

Figure 2B:
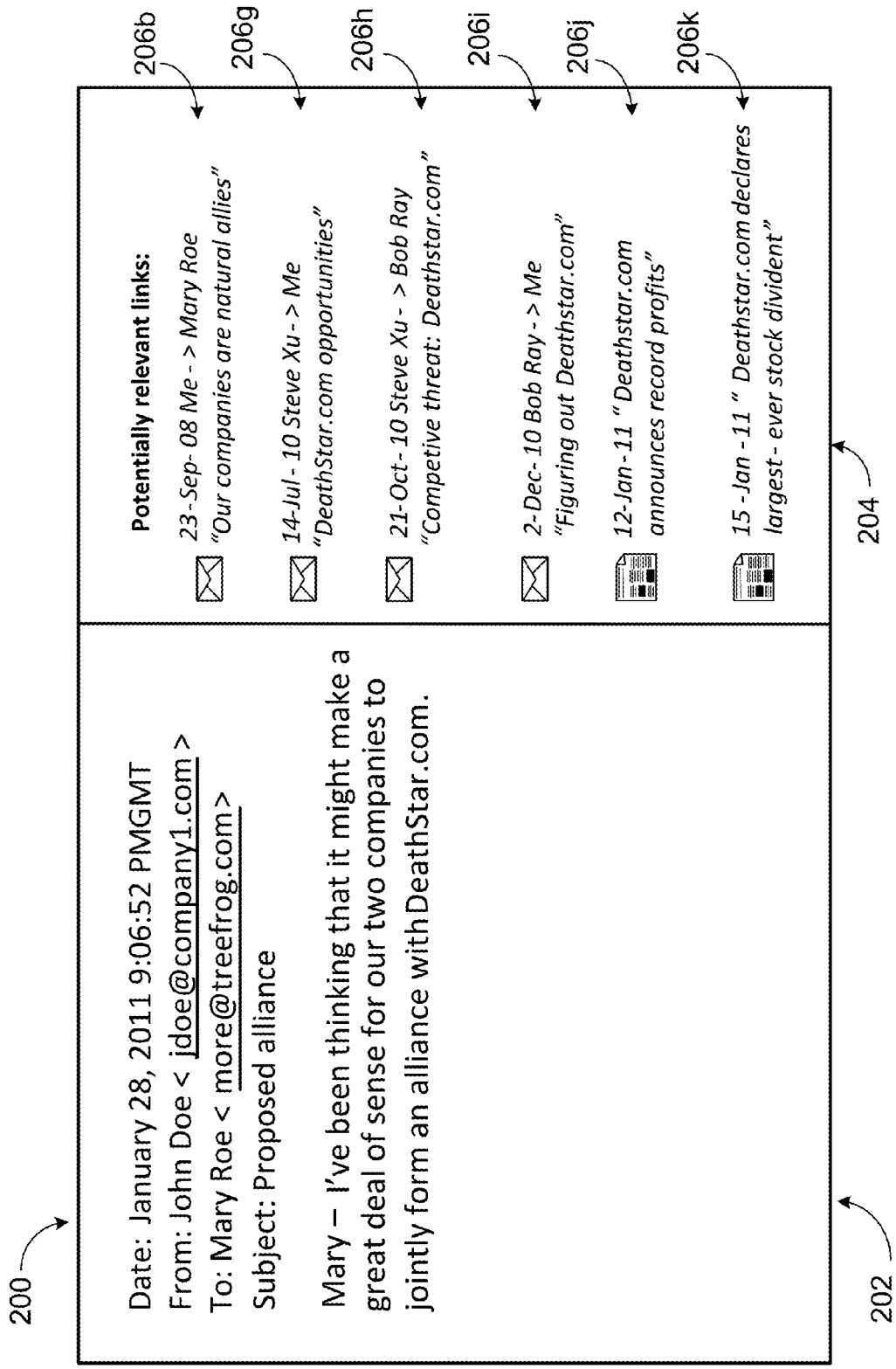

As shown in FIG. 2B, as the user continues to compose the email 202, the related content list 204 can be updated (in real time while the user is composing) based on additional content added to or changed in the email 202. Here, several of the items in the related content list 204 have changed. One item of related content 206b has been moved to the top of the list. The item of related content 206b was previously included in the list, but also includes the word "allies" in its email subject line, and so may be more relevant to the email 202 being composed, which now contains the word "alliance." Further, new items of related content 206g-206k have appeared in the related content list 204. The email 202 being composed now contains a phrase identifying a specific business entity, "DeathStar.com." A mention in an email of this specific business entity is likely to be relatively rare compared to the inclusion of generic words such as conventional English words. Other communications identifying the same specific business entity are likely to be highly relevant to the email 202 being composed and so the new items of related content 206g-206k (both other emails 206g-206i and news articles 206j-206k) all mention "DeathStar.com."

Figure 2C:
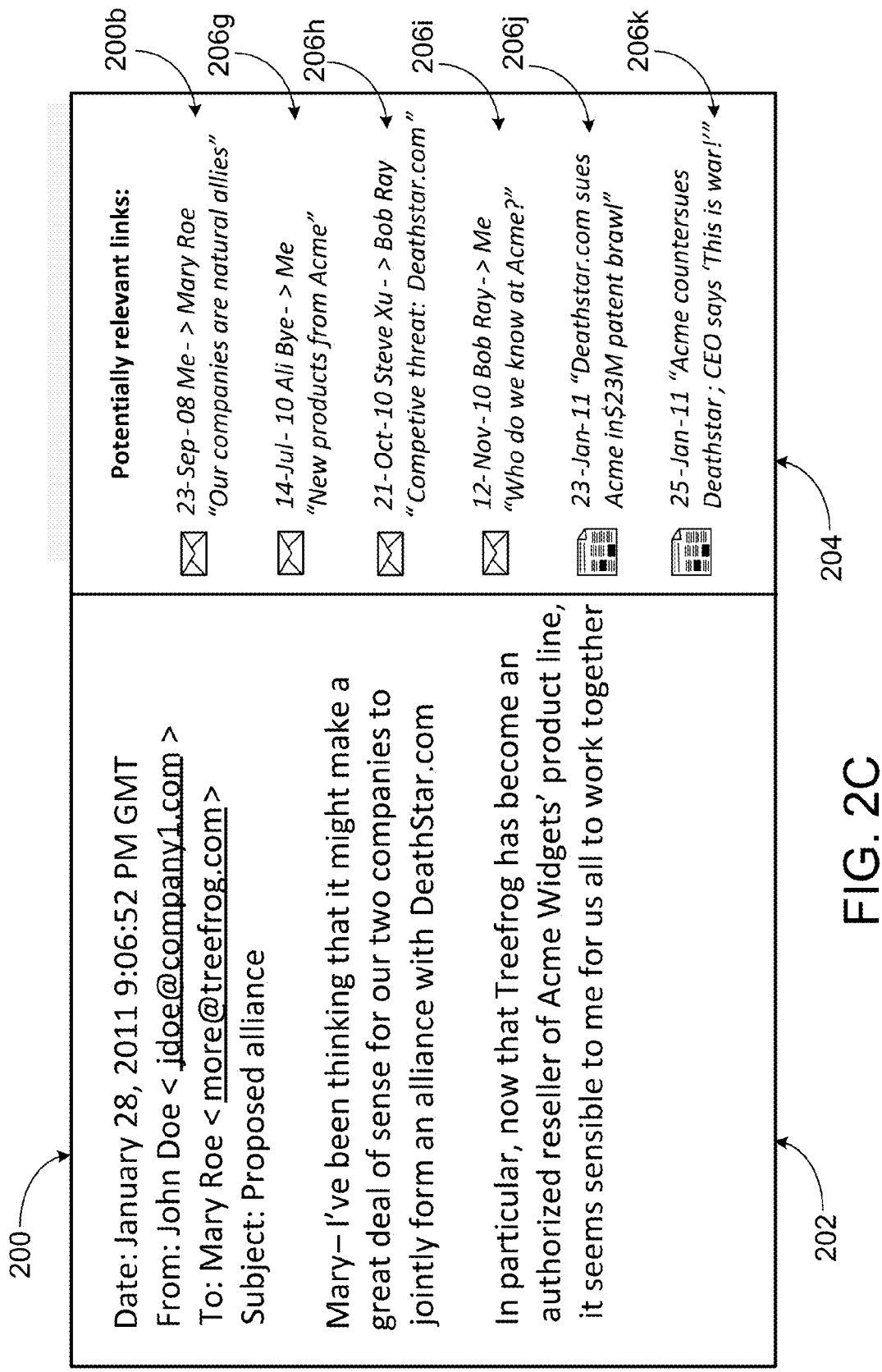

As shown in FIG. 2C, as the user has written more of the email 202, the related content list 204 is further updated (in this example, in real time) based on additional material added to or changed in the email 202. In this example, the email 202 includes mention of another specific business entity, "Acme Widgets." Some items of related content 206b, 206h that previously appeared in the related content list 204 are still relevant and still appear in the list. New items of related content 206l-206o have appeared in the related content list 204, each at least relating to the word "Acme" and thus likely to be highly relevant to the content of the email 202. Also, two of the items of related content 206n, 206o are news articles that relate to both the words "Acme" and "Deathstar.com." Here, the news articles mention a legal battle between the two business entities. These items of related content 206n, 206o are likely to be of interest to the user writing the email 202 given that he has mentioned both Acme and DeathStar.com and is likely interested in news articles that discuss a relationship between those two specific business entities.

Figure 3:
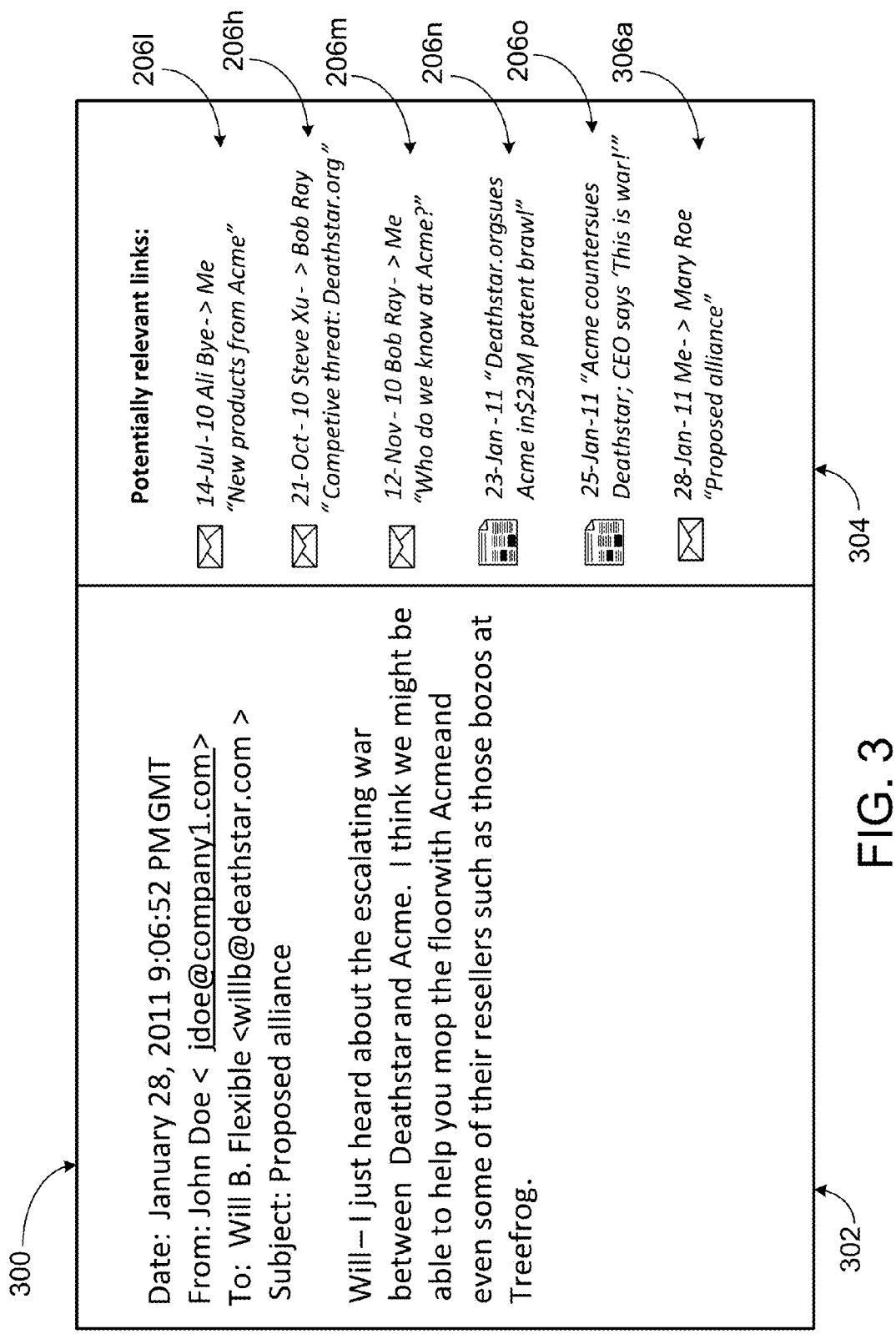

FIG. 3 shows another email interface 300 including an email 302 being composed and a related content list 304 being displayed alongside the email, in a similar manner to the email interface 200 shown in FIGS. 2A-2C. In this email interface 300, the user ("John Doe") of the email interface 200 of FIGS. 2A-2C is composing a new email 302 based on the information he learned from the related content list 204 of FIG. 2C. In particular, the user learned about the legal battle between the two business entities Acme and DeathStar.com. In response to learning this information, the user is composing the new email 302 to a person ("Will B. Flexible") on the topic of the legal battle.

The related content list 304 in this email interface 300 shows some items of related content 206h, 206l-206o that previously appeared in the related content list 204 of the email interface 200 shown in FIG. 2C. Because this email 302 has a topic of a proposed alliance between business entities "Deathstar.com" and "Acme," just like the email 202 shown in FIG. 2C, it is likely that content that is related to one of the emails will also be related to the other email, and so the same related content 206h, 206l-206o appeared in the search for related content presented in the related content list 304 for this email 302. The related content list 304 also shows, as an item of related content 306a, the same email 202 that the user previously composed discussing the business entities "Deathstar.com" and "Acme" as shown in FIGS. 2A-2C.

In some implementations, rather than display a real-time related content list, the email server 106 (FIG. 1B) could generate a related content list on a regular (or irregular) schedule based on a user's activity over a time interval such as the previous day. FIG. 4 shows an email 402 received by the user, "John Doe," showing a related content list 404 embedded in the email 402. The related content list 404 shows items of related content 406a-406e that have been identified by the email server as relevant or useful based on the emails that the user sent and received in the previous day. In this example, if many emails sent and received by the user over the course of the previous day were related to the specific business entities "Acme" and "Deathstar.org" (for example, the emails 202, 302 shown in FIG. 2C and FIG. 3), then the related content list 404 shows items of related content 406a-406e that relate to either or both of "Acme" and "Deathstar.org." The email 402 also provides a link 408 which the user can use to access configuration options for the related content list 404. In some examples, the user can configure how many items of related content appear in the list and how often the related content list is compiled and sent to the user; the user can configure the type(s) of data to be searched; the user can configure the size of each short summary; the user can configure levels of urgency/importance attached to different kinds of searches; the user can choose to search only sent communications, or received communications, or both; and the user can configure whether or not results that are to be delivered asynchronously should be sent by email, instant message, voice, fax, or postal mail, or another communication method. These and combinations of them, and other configuration opportunities can be offered.

A content database such as the content database 110 shown in FIG. 1B (or any other information source or body of target information) may have content that is accessible to only some users and not others. For example, referring to FIG. 1B, in an email system 100, emails 108 sent or received by a user 112 may be associated with access permissions which permit only that user 112 to access those emails 108 and do not permit another user 102 to access those emails 108. However, those emails 108 may be related to an email 104 that the other user 102 is composing. If the other user 102 is using an email system that provides access to related content (for example, the related content lists 204, 304, 404 of FIG. 2A-FIG. 4), then the email system 100 can provide the other user 102 with access to the emails 108 associated with access permissions if the email system 100 gains authorization to provide such access.

In some implementations, the email server 106 of the email system 100 can request permission from the user 112 having access to emails 108 to allow the other user 102 to access the emails 108. FIG. 5A shows an example interaction 500 for requesting email access permissions. The email server 106 has determined than an access-restricted email 504 may be of interest to a user 102 based on the content of another email or other emails that the user 102 is composing. The access-restricted email 504 is associated with access permissions 506 that prevent the access-restricted email 504 from being displayed to the user 102. The access permissions 506 may be data associated with the email server 106 (for example, data stored in the content database 110 of FIG.

1B) which indicates which users are authorized (have permission) to access which emails.

An authorized user 112 has the ability to grant access to the access-restricted email 504. For example, the authorized user 112 may be a user who sent the access-restricted email 504 or received the access-restricted email 504, or the authorized user 112 may be a system administrator who is charged with managing access permissions of emails associated with the email system 100.

The email server 106 can send 508 an access permission request 510 to the authorized user 112 identifying the access-restricted email 504 and requesting that the authorized user 112 grant access to the access-restricted email 504. In some examples, the access permissions request 510 may identify the other user 102 that the email system 100 will be granting access to, so that the authorized user 112 can decide whether or not it is appropriate for the other user 102 to have access to this particular email 504. Also, in some examples, the access permissions request 510 identifies multiple emails for which the authorized user 112 can decide to grant access, and also may identify multiple users for whom to grant access to the identified email (or emails).

If the authorized user 112 decides to grant access, he can respond to the access permission request 510 by sending 512 to the email server 106 an access permission authorization 514 granting access to the access-restricted email 504. For example, the access permission request 510 may itself be an email, and the access permission authorization 514 may also take the form of an email, may take the form of a response option in a web page linked to by the access permission request 510, or may take another form.

In some implementations, there are multiple authorized users 112. In some examples, each of the multiple authorized users 112 may receive the access permission request 510, or one may be chosen among the multiple authorized users 112 based on a work schedule or other shared responsibility scheme. In some examples, only one of the multiple authorized users 112 replies to the access permission request 510 with a permission authorization 514 to grant access to the access-restricted email 504. In some examples, more than one, or all, of the multiple authorized users 112 replies to the access permission request 510 to grant access to the access-restricted email 504.

In some implementations, the access permission request 510 can be sent using a real-time communication method such as telephone or instant message, or the access permission request 510 can be sent using an asynchronous (non-real-time) communication method such as email or voicemail.

When the email server 106 receives the access permission authorization 514 from the authorized user 112, the email server 106 can alter the access permission 506 associated with the access-restricted email 504 so that the other user 102 can access the access-restricted email 504. For example, access-restricted email 504 can be shown in a list of related content provided to the other user 102. The email server 106 can also provide 516 the email 504 directly to the other user 102 at the request of the other user 102. In some examples, the change in access permission 506 of the access-restricted email 504 may be temporary, or the change in access permission 506 of the access-restricted email 504 may be permanent, depending on the access permission authorization 514 provided by the authorized user 112.

FIG. 5B shows an example of an access permission request 510 in the form of an email message 520. The email message 520 is sent from an automated search robot 522 to an authorized user 112 (here, "Orlando Scott-Crowley").

The email message 520 indicates to the authorized user 112 that another user 524 ("Nathaniel Borenstein") would be helped if an archived email message 526 were made available to the other user 524. For example, the email server 106 (FIG. 1B) may have determined that the archived email message 526 is related to another email that the other user 524 is composing. The email message 520 includes a hyperlink 528 to the archived email message 526 so that the authorized user 112 can view the contents and determined if the archived email message 526 is appropriate to make available to the other user 524.

The email message 520 also presents the authorized user 112 with options for granting or denying access. One option button 530 allows the authorized user 112 to choose to grant the other user 524 access to just this archived email message 526. Another option button 532 allows the authorized user 112 to choose to grant the other user 524 access to this archived email message 526 and any other archived email messages that may be useful to the other user 524 in the future. Another option button 534 allows the authorized user 112 to choose to deny the other user 524 access to this archived email message 526. Another option button 534 allows the authorized user 112 to choose to deny the other user 524 access to this archived email message 526 and also refuse requests to grant the other user 524 access to other archived email messages.

In some implementations, an organization using the email system 100 may have an access permission hierarchy that determines which users can access which emails associated with the email system. For example, FIG. 6 shows an access permissions hierarchy 600 having three levels 602a, 602b, 602c to which users can belong. Each level is associated with a collection of emails (for example, some of the emails associated with the content database 110 shown in FIG. 1B). The first level 602a is associated with a first collection of emails 604a, the second level 602b is associated with a second collection of emails 604b, and the third level 602c is associated with a first collection of emails 604c. Each level is also associated with users of the system. The level 602a is associated with a user 606a, the second level 602b is associated with three users 606b-606d, and the third level 602c is associated with five users 606e-606i.

In this hierarchy 600, any user belonging to level is authorized to access emails associated with the same level as well as emails associated with levels below. For example, the user 606a who belongs to the first and highest level 602a, is authorized to access the collection of emails 604a associated with the first level 602a as well as the collections of emails 604b, 604c associated with the second and third levels 602b, 602c. Further, the users 606b-606c who belong to the second level 602b are authorized to access the collection of emails 604b associated with the second level 602b as well as the collection of emails 604c associated with the third level 602c. However, the users 606b-606c who belong to the second level 602b are not authorized to access the collection of emails 604a associated with the first level 602a. In some examples, the users 606b-606c can be given permission to access some or all of the collection of emails 604a associated with the first level 602a. For example, one of the users 606b-606c may be able to engage in the interaction 500 shown in FIG. 5A for gaining access to a particular email or multiple emails. The users 606e-606i who belong to the third level 602c are authorized to access the collection of emails 604c associated with the third level 602c and no other collections of emails. In some examples, the users 606e-606i who belong to the third level 602c can also gain access to the other collections of emails 604a, 604b through an authorization process such as the interaction 500 shown in FIG. 5A.

In some implementations, permissions can be set up in other ways. In some examples, permissions can be assigned according to roles within an organization rather than just according to a hierarchy. For example, each member of a sales staff can be authorized to see emails written by other members of the sales staff. In some examples, permissions can be assigned to a user based on factors other than the user's position in a hierarchy. For example, a user in a low hierarchical level can be given access to some or all emails normally only accessible to users higher in the hierarchy based on a special status of the user. In some examples, permissions can be assigned according to activities of a user. For example, a member of an organization who works on a particular project or handles a particular customer can be authorized to access the emails relating to that particular project or that particular customer. Other types of authorization are possible.

FIG. 7 is a flowchart of an example process 700 for providing a list of related content relevant to an email that a user is composing. For example, the process 700 could be used by the email server 106 of FIG. 1B to provide a related content list 204, 304, 404 as shown in one of FIG. 2A-FIG. 4. At stage 702, the process 700 infers a search query related to email content. For example, the search query can be inferred from content of an email newly composed by a user, such as the emails 202, 302 shown in FIG. 2A-FIG. 3. At stage 704, the process 700 searches a communications archive using the inferred query. For example, the communications archive can include the content database 110 containing emails shown in FIG. 1B and the communications archive can also include one or more of a secondary content database 116 also shown in FIG. 1B and containing other types of communications or data such as blogs, social network communications, news articles, journal publications, and patents. At stage 706, the process provides to a user the results of the search performed on the communications archive. For example, the results of the search can be provided in the form of a related content list 204, 304, 404 as shown in FIG. 2A-FIG. 4.

FIG. 8 is a block diagram of an example computer system 800 that forms one of the systems of the network that is engaged in completing a task. For example, referring to FIG. 1B, the email server 106 could be an example of the system 800 described here.

The users 102, 112 could also be using general-purpose computers, network appliances, mobile devices, or other electronic systems arranged as the system 800 described here. For example, the email interface 200 of FIGS. 2A-2C or the email interface 300 of FIG. 3 or the email 402 of FIG. 4 could be displayed on a computer system 800. The system 800 includes a processor 810, a memory 820, a storage device 830, and an input/output device 840. Each of the components 810, 820, 830, and 840 can be interconnected, for example, using a system bus 850. The processor 810 is capable of processing instructions for execution within the system 400. In some implementations, the processor 810 is a single-threaded processor. In some implementations, the processor 810 is a multi-threaded processor. The processor 810 is capable of processing instructions stored in the memory 820 or on the storage device 830.

The memory 820 stores information within the system 800. In some implementations, the memory 820 is a computer-readable medium. In some implementations, the memory 820 is a volatile memory unit. In some implementations, the memory 820 is a non-volatile memory unit.

The storage device 830 is capable of providing mass storage for the system 400. In some implementations, the storage device 830 is a computer-readable medium. In various different implementations, the storage device 830 can include, for example, a hard disk device, an optical disk device, a solid-date drive, a flash drive, or some other large capacity storage device. For example, the storage device may store long-term data, such as data stored in the content database 110 shown in FIG. 1B. The input/output device 840 provides input/output operations for the system 800. In some implementations, the input/output device 840 can include one or more of a network interface devices, e.g., an Ethernet card, a serial communication device, e.g., an RS-232 port, and/or a wireless interface device, e.g., an 802.11 card, a 3G wireless modem, a 4G wireless modem, or a carrier pigeon interface. A network interface device allows the system 800 to communicate, for example, transmit and receive data such as emails sent between users 102, 112. In some implementations, the input/output device can include driver devices configured to receive input data and send output data to other input/output devices, e.g., keyboard, printer and display devices 860. In some implementations, mobile computing devices, mobile communication devices, and other devices can be used.

The email server 106 (FIG. 1B) can be realized by instructions that upon execution cause one or more processing devices to carry out the processes and functions described above, for example, communicating over a network to handle requests and responses.

Such instructions can comprise, for example, interpreted instructions such as script instructions, or executable code, or other instructions stored in a computer readable medium. The email server 106 be distributively implemented over a network, such as a server farm, or a set of widely distributed servers or can be implemented in a single computer device.

Although an example processing system has been described in FIG. 8, implementations of the subject matter and the functional operations described above can be implemented in other types of digital electronic circuitry, or in computer software, firmware, or hardware, including the structures disclosed in this specification and their structural equivalents, or in combinations of one or more of them. Implementations of the subject matter described in this specification, such as software for handling requests and/or responses, can be implemented as one or more computer program products, i.e., one or more modules of computer program instructions encoded on a tangible program carrier, for example a computer-readable medium, for execution by, or to control the operation of, a processing system. The computer readable medium can be a machine readable storage device, a machine readable storage substrate, a memory device, a composition of matter effecting a machine readable propagated signal, or a combination of one or more of them.

The term "system" may encompass all apparatus, devices, and machines for processing data, including by way of example a programmable processor, a computer, or multiple processors or computers. A processing system can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, executable logic, or code) can be written in any form of programming language, including compiled or interpreted languages, or declarative or procedural languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Computer readable media suitable for storing computer program instructions and data include all forms of nonvolatile or volatile memory, media and memory devices, including by way of example semiconductor memory devices, e.g., EPROM, EEPROM, and flash memory devices; magnetic disks, e.g., internal hard disks or removable disks; magneto optical disks; and CD ROM and DVD ROM disks. The processor and the memory can be supplemented by, or incorporated in, special purpose logic circuitry. Sometimes the email server 106 is a general purpose computer, and sometimes it is a custom-tailored special purpose electronic device, and sometimes it is a combination of these things.

Implementations can include a back end component, e.g., a data server, or a middleware component, e.g., an application server, or a front end component, e.g., a client computer having a graphical user interface or a Web browser through which a user can interact with an implementation of the subject matter described is this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

Certain features that are described that are described above in the context of separate implementations can also be implemented in combination in a single implementation. Conversely, features that are described in the context of a single implementation can be implemented in multiple implementations separately or in any sub-combinations.

The order in which operations are performed as described above can be altered. In certain circumstances, multitasking and parallel processing may be advantageous. The separation of system components in the implementations described above should not be understood as requiring such separation.

Although the system described analyzes the contents of emails to a search query, the analyzed information need not be an email, but could be another kind of message or another kind of user composition such as a memorandum, an article, another kind of document, an instant message, a text message, a voice mail, a video mail, or a fax.

Although we have described in example in which the target information sent back to the user is based on a particular email being composed by her, in some implementations, the reported information that is sent back to be determined based on more than one communication composed by the user. For example, over a period of time, the facility 5 could be watching the composition of a series of emails or other communications by a user, could infer a search strategy based not only on the current email, but on previous ones, and could report back information based on this more complex inference.

In addition, although we have described examples in which a single user composed the source communication that is the basis of the reported information returned back to the user, in some examples, the composed emails of multiple users could form the basis of the operation of the facility 5. For example, if three different users in a given department of a company were to compose emails in which they used words indicating a common interest in the names of companies operating in the mobile telephone business, the information reported back to them by facility 5 could be determined by the combination of their source communications, rather than only by one of them.

Other implementations are within the scope of the following claims.

The invention claimed is:

1. A computer-implemented method comprising by one or more processors of a computer system:
   receiving data representing at least a portion of content of at least one communication composed and sent by a first user;
   receiving target information that is related to the at least a portion of content composed and sent by a first user;
   identifying restricted information in the target information, the restricted information including content composed by a second user and not sent to the first user, and having access restrictions that prohibit reporting the restricted information to the first user;
   generating a first transmission intended for the second user, the second user being associated with at least some of the restricted information, the first transmission representing a request for the second user to authorize access to the at least some of the restricted information;
   receiving a second transmission, the second transmission indicative of authorization to access the restricted information; and
   in response to the authorization, reporting, to the first user, at least some of the selected target information, the at least some target information including the at least some of the restricted information.

2. The method of claim 1, wherein the restricted information is associated with access restrictions that prohibit reporting the restricted information to the first user.

3. The method of claim 1, wherein the access restrictions are associated with the second user.

4. The method of claim 1, comprising inferring a strategy from at least a portion of the content composed and sent by the first user, the strategy for selecting the target information from a body of target information, which includes content composed by a the second user and not sent to the first user.

5. The method of claim 1, wherein the target information comprises emails, blogs, social network communications, news articles, journal publications, and patents.

6. The method of claim 1, wherein at least one of the first transmission and the second transmission comprise an email message an instant message, or a real-time telephone call.

7. The method of claim 1, wherein the first transmission includes an identification of the first user.

8. The method of claim 1, wherein the second transmission includes an identification of the second user.

9. The method of claim 1, wherein the at least some of the restricted information includes an email message identified sent to or received by the second user.

10. The method of claim 1, wherein the content composed and sent by the first user is pertinent to an organization and/or its members; and wherein the content composed by the second user is pertinent to the organization and/or its members.

11. A computer-implemented method comprising by one or more processors of a computer system:

receiving a first communication, the first communication representing a request to authorize access to information identified in a body of target information as restricted information, the restricted information being associated with at least a portion of content of at least one communication composed and sent by a first user, the restricted information including content composed by a second user and not sent to the first user;

receiving an authorization for the first user to access the restricted information, the authorization given by the second user in a user interface, the second user being associated with access restrictions of the restricted information; and transmitting a second communication, the second communication indicating that the second user has authorized the first user to access to the restricted information.

12. The method of claim 11, comprising causing the user interface to display a graphical representation of the request.

13. The method of claim 12, wherein the graphical representation of the request is displayed in the form of an email message.

14. The method of claim 12, wherein the graphical representation identifies at least some of the restricted information.

15. The method of claim 12, wherein the graphical representation identifies the first user.

16. The method of claim 12, wherein the graphical representation includes one or more buttons representing options associated with authorizing access to the restricted information.

17. The method of claim 16, wherein the options include authorization for the first user to access the restricted information, authorization for the first user to access any restricted information of the second user, denying the first user to access the restricted information, and denying the first user access any restricted information of the second user.

18. The method of claim 11, wherein the user interface enables the second user to access at least some of the restricted information.

19. The method of claim 11, wherein the restricted information includes information identified as authored by the second user.

20. The method of claim 11, wherein the authorization given by the second user in the user interface comprises an authorization for the first user to access the restricted information.

21. The method of claim 11, wherein the authorization given by the second user in the user interface comprises an authorization for the first user to access any restricted information of the second user.

22. The method of claim 11, wherein the target information is selected from a body of target information based on a strategy inferred from at least a portion of the content composed and sent by the first user, the body of target information including content composed by the second user and not sent to the first user.

23. The method of claim 11, wherein the content composed and sent by the first user is pertinent to an organization and/or its members; and wherein the content composed by the second user is pertinent to the organization and/or its members.

* * * * *